(12) United States Patent
Monteux et al.

(10) Patent No.: US 8,982,148 B2
(45) Date of Patent: Mar. 17, 2015

(54) STATIONARY OR MOBILE TERMINAL CONTROLLED BY A POINTING OR INPUT PERIPHERAL

(75) Inventors: Guillaume Monteux, Paris (FR); Nicolas Rucine, Nantes (FR); Raphaël Monrouzeau, Maisons Alfort (FR); Luc Vauvillier, Le Plessis-Bouchard (FR)

(73) Assignee: Milibris, Paris (FR)

( * ) Notice: Subject to any disclaimer, the term of this patent is extended or adjusted under 35 U.S.C. 154(b) by 515 days.

(21) Appl. No.: 13/395,504

(22) PCT Filed: Sep. 21, 2010

(86) PCT No.: PCT/EP2010/063850
§ 371 (c)(1),
(2), (4) Date: Oct. 18, 2012

(87) PCT Pub. No.: WO2011/036138
PCT Pub. Date: Mar. 31, 2011

(65) Prior Publication Data
US 2013/0033499 A1 Feb. 7, 2013

(30) Foreign Application Priority Data
Sep. 23, 2009 (FR) ...................................... 09 56577

(51) Int. Cl.
*G09G 5/10* (2006.01)
*G06F 17/00* (2006.01)
*G06F 3/0483* (2013.01)

(52) U.S. Cl.
CPC .................................... *G06F 3/0483* (2013.01)
USPC ......................................................... 345/619

(58) Field of Classification Search
CPC ............ G06F 3/0481; G06F 17/30994; G06F 17/211; G06F 17/30873; G06F 2203/04806; G06F 17/217; G06F 3/0483; G06F 3/03545; G06F 3/041; G06F 17/212; H04N 1/32776; H04N 2201/3225; G06T 2207/30176; G06T 3/40
USPC ........................................... 345/619; 715/200
See application file for complete search history.

(56) References Cited

U.S. PATENT DOCUMENTS

| 5,900,876 A | 5/1999 | Yagita et al. |
| 6,486,895 B1 | 11/2002 | Robertson et al. |
| 2002/0113823 A1* | 8/2002 | Card et al. ..................... 345/776 |

(Continued)

FOREIGN PATENT DOCUMENTS

EP 1621988 2/2006

OTHER PUBLICATIONS

International Search Report as issued for PCT/EP2010/063850.

*Primary Examiner* — Kee M Tung
*Assistant Examiner* — Haixia Du
(74) *Attorney, Agent, or Firm* — Pillsbury Winthrop Shaw Pittman LLP (57) ABSTRACT

A stationary or mobile terminal controlled by a pointing or input peripheral device is presented. The invention pertains to the field of man-machine interfaces (MMI) applied to digital reading. There is provided a stationary or mobile terminal that is capable of reproducing, when used, the sensation of reading paper on a screen, of developing novel modes of reading, and of enabling press groups to render the publications thereof paperless while doing away with the material and technical limitations of various reading terminals.

4 Claims, 12 Drawing Sheets

(56) References Cited

U.S. PATENT DOCUMENTS

2006/0197782 A1 * 9/2006 Sellers et al. ............... 345/660
2008/0235563 A1   9/2008 Nakamura
2009/0058822 A1   3/2009 Chaudhri

* cited by examiner

STATIONARY OR MOBILE TERMINAL CONTROLLED BY A POINTING OR INPUT PERIPHERAL

CROSS REFERENCE TO RELATED APPLICATIONS

This application is the U.S. National Stage of PCT/EP2010/063850, filed Sep. 21, 2010, which in turn claims priority to French Patent Application No. 0956577, filed Sep. 23, 2009, the entire contents of all applications are incorporated herein by reference in their entireties.

TECHNICAL FIELD OF THE INVENTION

The present invention relates to a stationary or mobile terminal that is capable of being controlled by a pointing or input peripheral. The invention is situated in the field of MMI (Man-Machine Interfaces), applied to digital reading.

TECHNOLOGICAL BACKGROUND OF THE INVENTION

Digital reading has the same requirements as handling a paper document. The reader must be able to leaf through the document, read it in detail and easily find his bearings in the document. To respond to these needs, Internet applications or services for reading offer tools (zoom view, thumbnail images) that are always presented in the margin of the document itself. The user experience remains very limited in, the presentation of press/magazine/book type content.

Leafing through the document presented in a double page is used in almost all cases, offering a zoom tool on a high definition version of the page is common, and some solutions comprise a fixed thumbnail grid enabling the new page to be displayed to be selected. These tools remain separated from each other in their presentation and manipulation.

Content of the press/magazine/book type is summarized in existing solutions, and it is difficult to attract the reader to new supports without tools intended for the reader. The idea is to design a reading mode that is as fluid as possible, capitalizing on the presentation possibilities of a digital document.

GENERAL DESCRIPTION OF THE INVENTION

In this context, the present invention aims to provide a stationary or mobile terminal in which the issue is to reproduce in terms of use the sensation of reading paper on a screen, developing novel modes of reading, and enabling press groups to render their publications paperless by disregarding the material and technical constraints of various reading terminals.

For this purpose, the invention proposes a stationary or mobile terminal capable of being controlled by a pointing or input peripheral characterized in that the terminal comprises
  storage means on which a plurality or pages are stored;
  means for displaying a plurality of stored pages in the form of a grid called a breadcrumb trail, each element of said breadcrumb trail being composed of the front or back of a page called the single page, or the front of one page and the back of another conjoined page called a double page, the assembly of said elements being ordered by default in the ascending direction of the pages;
  means for displaying a view called the leafing view composed of two stacks of recto verso pages respectively called the left stack and the right stack and respectively ordered in the ascending direction and the descending direction, or a single stack containing all of the recto verso pages, ordered in the ascending or descending direction, all belonging to the plurality of stored pages;
  means for controlling said display means comprising:
    means for detecting user interaction by means of a mouse and/or a keyboard, comprising the detection of the position and movements of a cursor, the pressure and release of a button, the direction and amplitude of a scroll wheel movement, and the single, maintained or repeated pressing of one or More keys of a keyboard simultaneously;
    means to detect the single or double target page of said breadcrumb trail that is defined as being one of said single or double pages depending on the detection of the position of the cursor or the position of said breadcrumb trail on the screen;
    means to execute an animation simulating a zoom-in or zoom-out composed of a homothety and/or a translation of said breadcrumb trail.

Thanks to the invention, browsing is used that reproduces a sensation of leafing through a work in paper, a progressive zoom enabling pointing to where the user wishes to read while maintaining optimal display quality, and a presentation in grid form of each page of the document, offering an overall vision and enabling any page whatsoever to be zoomed in on. The principle of browsing is based on these interconnected views by a system of transitions calculated in real time, the passage from one view to another being transparent to the user. One therefore really has the sensation of being able to move back or advance as required, at any time, on any part whatsoever of the document presented.

The main advantage of this solution is to present a digital publication in a manner that is as faithful as possible to its paper equivalent, enabling browsing and ergonomics that make the most of rendering the presented document paperless to create novel reading uses. No existing solution offers unified browsing enabling the document to be read and leafed through and the reader to get his bearings in the document. The invention is designed to enable editors and press groups to disseminate a digital publication on any screen whatsoever, while forming a community of readers around the novel uses of digital reading. The end user of our invention is therefore any reader who wishes to consult on a screen any digital document whatsoever.

Passage is understood to refer to an animation type transition (defined by the composite of a rotation and a translation that is variable over time) when the single or double current page is changed.

The terminal according to the invention may also present one or more of the characteristics below, considered individually or according to all technically possible combinations:
  said control means comprise means to execute a composite of a hothothety center and variable ratios and/or a variable vector translation of said breadcrumb trail, these variations being dependent either on the position of the cursor, the direction and amplitude of the scroll wheel movement, the dimensions and position of said breadcrumb trail, or the number of successive presses on or the maintained press on one or more keys of the keyboard simultaneously, the dimensions and position of said breadcrumb trail;
  said control means comprise means to modify the animation simulating a zoom-in or zoom-out composed of a homothety and/or a translation of said breadcrumb trail, enabling the progressive refocusing of said single or double target page of the breadcrumb trail as its dimensions move towards the fixed dimensions of said left and right current pages of the leafing view;

said control means comprise means for displaying and masking said breadcrumb trail and leafing view, ensuring an invisible transition for the user by stacking said single or double target page and said left and right current pages when their respective dimensions and positions are identical;

said control means comprise means for detecting the change of current pages by the user in said leafing view, and for modifying the position of said breadcrumb trail when it is masked, enabling the continuity of invisible transitions for the user by stacking the new current pages of said leafing view with the corresponding double page of said breadcrumb trail;

said control means comprising:
  means to go from said left and right current pages, respectively called pages N−1/N, to the next pages in the right stack, called pages N+1/N+2, or to the preceding pages in the left stack, called pages N−3/N−2, depending on the detection of the position of the cursor when pressing the mouse button, called the initial position, and the detection of the position of the cursor when releasing the mouse button, called the final position, or the detection of a press on a keyboard key;
  means for stopping the passage from said pages N−1/N to the following pages, called pages N+1/N+2, and returning from the following pages, called pages N+1/N+2, to the current pages, called pages N−1/N;
  means for stopping the passage from said pages N−1/N to the preceding pages, called pages N−3/N−2, and returning from the preceding pages, called pages N−3/N−2, to the current pages, called pages N−1/N.

Target page is understood to refer to a page in the leafing view that is defined as being either the left current page or the right current page depending on the position of the cursor or the pressed keyboard key.

DETAILED DESCRIPTION OF PREFERRED FORMS OF EMBODIMENT OF THE INVENTION

Other characteristics and advantages of the invention will clearly emerge from the description given below, for indicative and in no way limiting purposes, with reference to the attached FIGS. 1 to 31.

The terminal according to the invention comprises several software means (i.e., applications) dedicated to implementing the invention.

The terminal according to the invention comprises 3 modes of presenting the same document on a screen, each mode having a different utility to respond to the needs of the reader: Leafing, reading and searching.

These modes of presentation will be distinguished according to the zoom level applied to the graphic objects representing the pages of the document: "leafing" mode, where the document is presented with a zoom of 100%, "zoom" mode for a zoom level greater than 100%, and "breadcrumb trail" mode for a zoom level of less than 100%. When launching the application, the reading mode by default is leafing mode.

Leafing Mode

Figure 1:
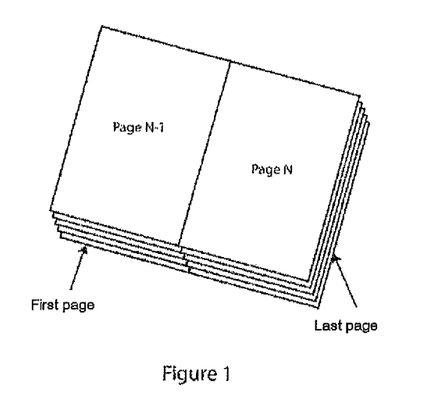
FIG. 1 shows a layout of pages composed of two stacks of pages side-by-side according to an embodiment.

Leafing mode offers the user a layout of pages of the publication that is faithful to the appearance of the paper document, composed of two stacks of pages side-by-side (FIG. 1).

Figure 2:
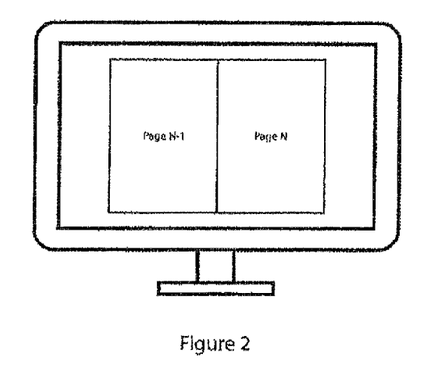
FIG. 2 shows a view of a double page composed of two pages, N−1 and N, at the top of each stack.

The left stack includes the preceding pages classified in ascending order, the right stack includes the following pages classified in descending order. The default view is therefore a double page composed of two pages N−1 and N at the top of each stack (FIG. 2). The principle of browsing is to make the pages turn from one stack to the other to simulate leafing through the document.

Figure 3:
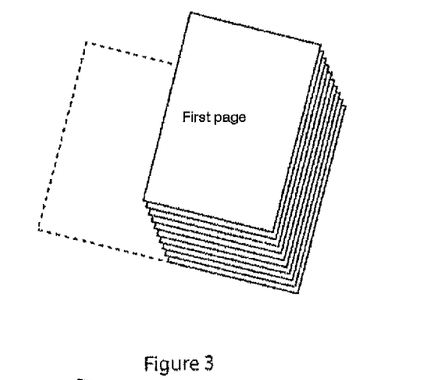
FIG. 3 shows a right stack of pages with the first page positioned at the top of the stack.
Figure 4:
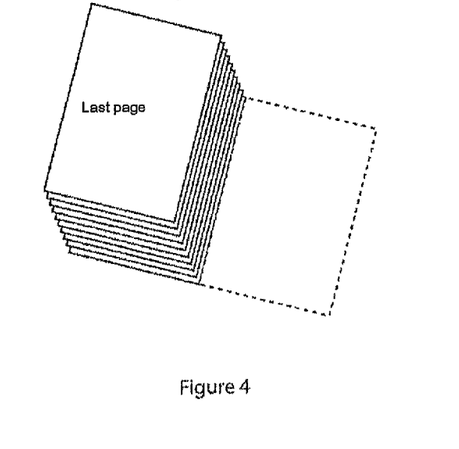
FIG. 4 shows a left stack of pages with the last page positioned at the top of the stack.
Figure 5:
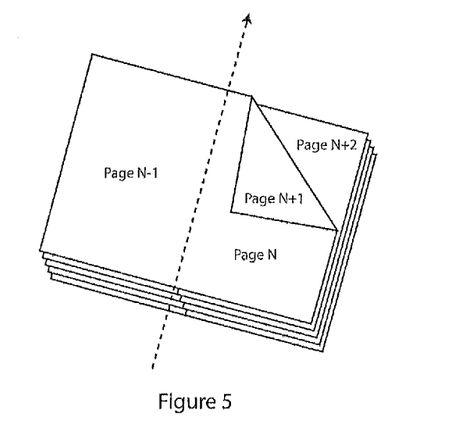
FIGS. 5-7 show the passage from one double page to another double page through animation according to an embodiment.

The presentation of pages is different when one is positioned on the first page (FIG. 3) or on the last page of the document (FIG. 4). As one of the stacks is necessarily blank, the screen only has a single page notifying the reader of the start or end of the document, Principle of Browsing Passage from one double page to another is done visually through animation. To go from double page N−1/N to the following double page N+1/N+2, right page N/N+1 is turned progressively to the left, masking its front N and displaying its back N+1 as the page moves away from the right edge (FIG. 5). The turned page N/N+1 remains attached by its left edge to the central axis of the double pages and is stacked on the left stack once the page is completely turned, thereby covering the back N−1 of the preceding page.

At the end of the animation, the left stack presents the back N+1, the right stack presents the front N+2 of the following page.

To go to the preceding double page, the animation is reversed symmetrically with relation to the central axis of the double pages, by starting the movement of the page from the left stack to go to the right stack. For the rest of the explanations, the default movement held is the passage to a following page, or a page turn from the right to the left.

Calculation of Page Turning Animation

Figure 6:
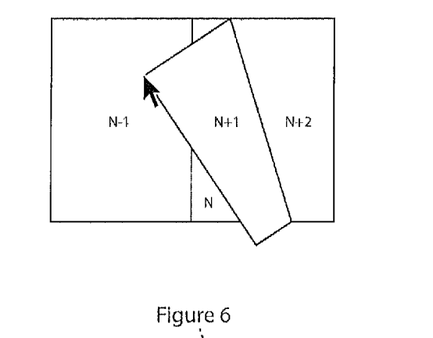
Figure 7:
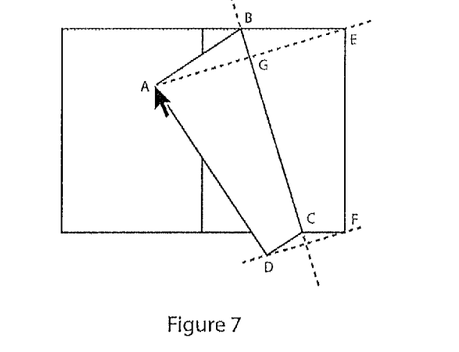

The display of a page in movement is calculated in real time, giving the illusion of literally pulling a corner of a page from one side to the other of the open document (FIGS. 6 and 7).

Starting from the position of the cursor represented by point A, the distance covered by the corner of the page is evaluated from its initial position represented by point E. Tracing a line perpendicular to segment [AE] and cutting the segment in its middle G, intersections B and C with the edges of the document are obtained. This segment [BC] is used as the axis of symmetry to define point D, i.e., the second corner of the page initially positioned at point F. The two polygons [ABCD] and [BEFC] thus obtained are used for the display of the turned page N/N+1 animation:

Polygon [BEFC] defines the masked part of front N

Polygon [ABCD] defines the visible part of back N+1

Simultaneous Animation of Several Pages (multipage)

The page turning animation is managed by a graphic object independent from the stack structure of the pages. It is created on demand, taking the front N and the back N+1 of the page in progress as parameters, and is eliminated once the animation has ended. Therefore, the object is known as a "transition" between two states, in this instance between the display of a double page N−1/N and the following double page N+1/N+2 (see FIG. 6).

This dissociation between page display and transition enables several objects of transition to be generated at the same time, without having to reach the end of an animation to generate a following animation. Each transition object is executed in a completely independent manner.

Figure 8:
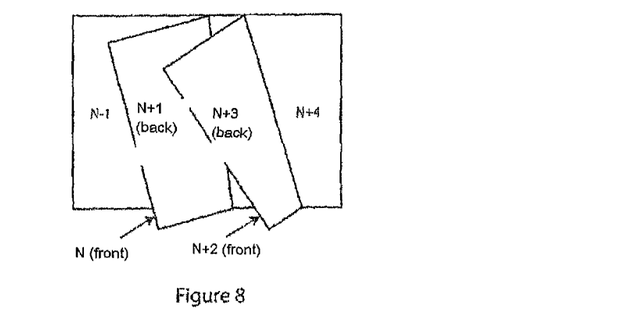
FIG. 8 shows the simultaneous animation to double page N+3/N+4 during the transition between the double pages N−1/N and N+1/N+2 according to an embodiment.

During the transition between the double pages N−1/N and N+1/N+2, it is possible to generate a simultaneous animation to double page N+3/N+4. In addition to the first transition object taking the front N and the back N+1 as parameters, a second transition object is then generated, taking the front N+2 and the back N+3 as parameters (FIG. 8).

This principle of several page turning animations in parallel is called "multipage" animation and enables an infinite number of simultaneous transition objects. However, it is limited to an arbitrary value (5 by default on a computer) calculated in correlation with the page turning animation speed, in order to preserve the animation fluidity and ease of use of the application on terminals with reduced calculation power.

Animation Initiation and Control

Page turning may be initiated and controlled in several ways depending on the pointing peripheral used, here we will detail the use of the mouse (similar to a tactile peripheral) and if necessary the keys of a computer keyboard.

The double pages displayed have reactive zones that are invisible to the user, enabling the interaction to be restricted to one part of the page.

These zones generally cover the top and bottom corners as well as the outer side of the page, but their dimensions, shapes and positions may be modified if needed.

Figure 9:
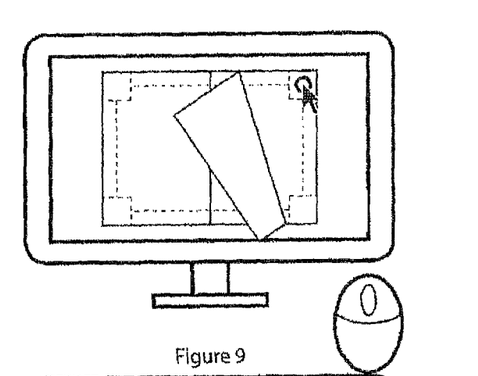
FIGS. 9-12 show an animation of a page according to an embodiment.

The user may click on a page corner or edge to initiate a linear animation executed without interruption (FIG. 9). Initiation may also be done by pressing on the left arrow and/or right arrow keys of the keyboard.

Figure 10:
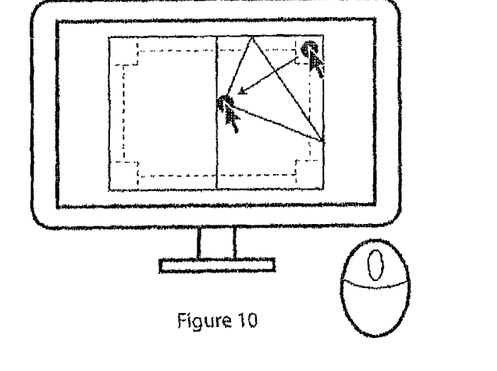

The user may thus drag a page corner to control the movement and animation. The page corner follows the movements of the cursor as the user continues to press on the mouse button (FIG. 10).

When the mouse button is released, the application compares the location of the cursor with its initial position at the start of the page turning animation.

Figure 11:
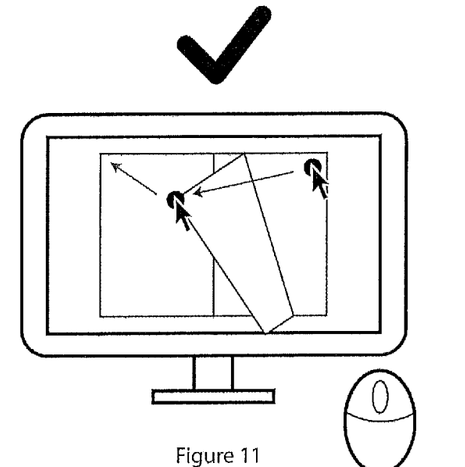

If these two points are on both sides of the central axis of the double pages (FIG. 11), the page change is validated by continuing the animation in a linear manner.

Figure 12:
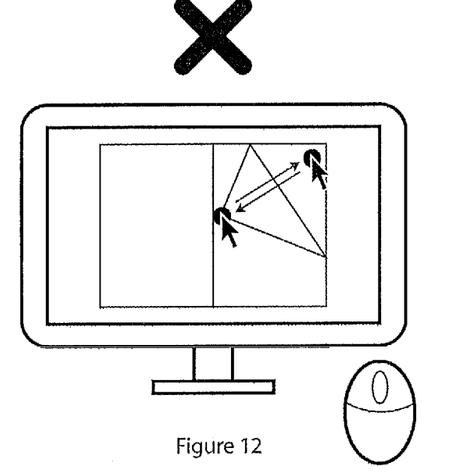

If the two points are on the same side of the central axis of the double pages (FIG. 12), the page change is cancelled by executing a reverse linear animation, bringing the turned page back to its previous state.

Zoom Mode

In leafing mode, the pages displayed have fixed dimensions, calculated according to the resolution of the screen used. The object of zoom mode is to be able to enlarge the representation of pages to read the content with more precision.

Figure 13:
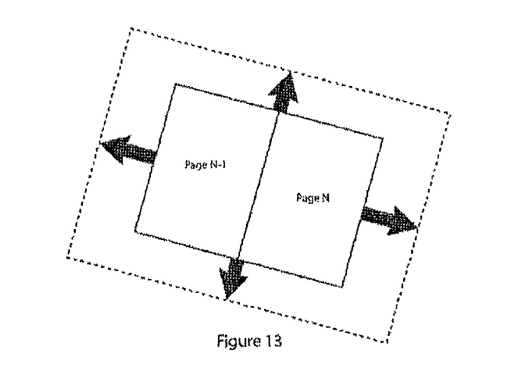
FIGS. 13-16 show a zoom mode operation according to an embodiment.
Figure 14:
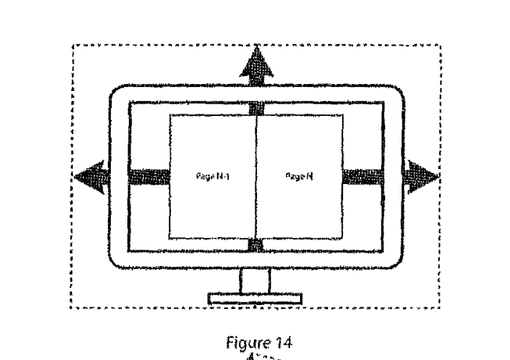

Zoom mode continues the double page presentation of leafing mode, but only comprises two graphic objects displaying the high-definition versions of pages N−1 and N of the document (FIGS. 13 and 14). The notion of object stacks is no longer applicable.

Figure 15:
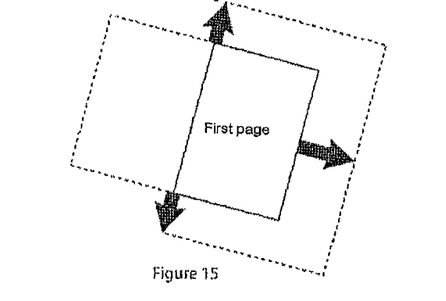
Figure 16:
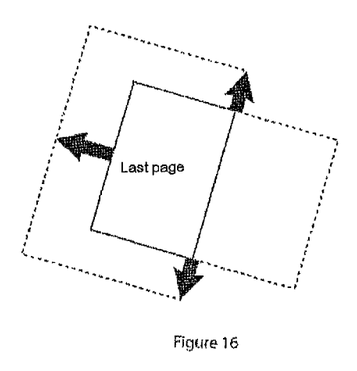

As with leafing mode, the presentation differs when one is on the first page (FIG. 15) or last page (FIG. 16), a single page then being visible.

Zoom Browsing and Manipulation

The zoom mode principle of utilization is to perform enlargement, contraction and translation movements of a high-definition version of the double page in progress.

Manipulation is done with any input peripheral, nevertheless, the use of a pointing peripheral such as a mouse or tactile surface enables all of the zoom mode functions to be exploited. We will take the mouse as an example for the following explanations.

Figure 17:
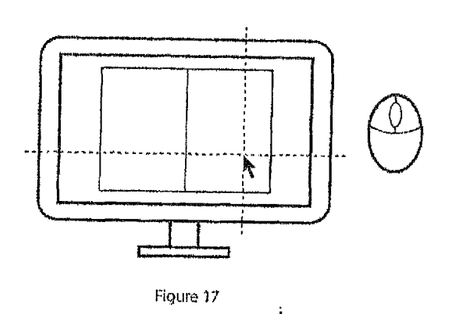
FIGS. 17-19 show a zoom browsing and manipulation operation according to an embodiment.

Browsing is done by directing the cursor of the mouse to a specific point (FIG. 17), and then by turning the scroll wheel of the mouse to modify the zoom level, either zooming in or zooming out depending on the direction of rotation given to the scroll wheel. The new zoom level is calculated proportionally to the force or to the number of scroll wheel strokes.

Figure 18:
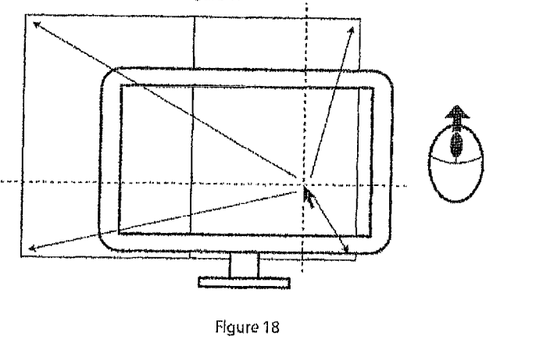

Zooming in leads to an animation enlarging the double page, whose homothetic center is set to the position of the cursor when initiating the event (FIG. 18).

Figure 19:
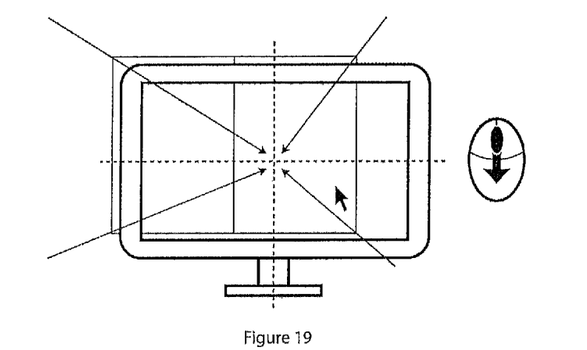

Zooming out leads to an animation contracting the double page, whose homothetic center is set to the center of the screen without taking the position of the cursor into consideration (FIG. 19).

Predefined Zooms

The application proposes several predefined zoom levels that may be initiated by a double-click. These zoom levels may be configured differently depending on the document displayed to adapt the browsing to its format and content.

The default behavior of the double-click is to zoom in to the next predefined zoom level or to a maximum allowable zoom level, by using the mouse pointer as the homothetic center (see FIG. 18).

If the double-click occurs while the maximum allowable zoom level has already been reached, the double page is reset to its initial position with a zoom value of 100%.

Example of a sequence: zoom 100%/zoom 200%/zoom 400%

If the original document provided by the editor allows it, it is possible to cut the text blocks and graphic objects of the pages as receivers of double-click events, effectively creating a grid of reactive zones on the pages.

Figure 20:
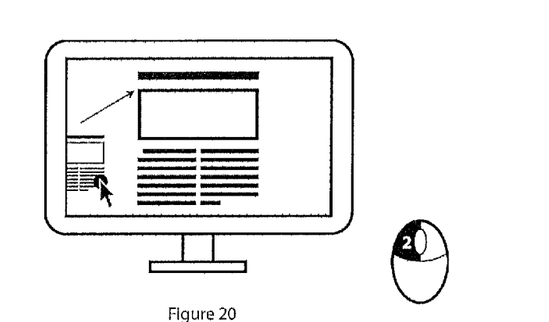
FIG. 20 shows a predefined zoom operation according to an embodiment.

If a double-click is performed, on one of these zones, the new zoom level and the homothetic center of the animation are calculated to display this part of the double page centered on the screen (FIG. 20). If a second double-click is performed consecutively on this same zone, the double page returns to the center of the screen with a zoom value of 100% like at the start of the zoom mode.

Page Displacement and Sliding

Figure 21:
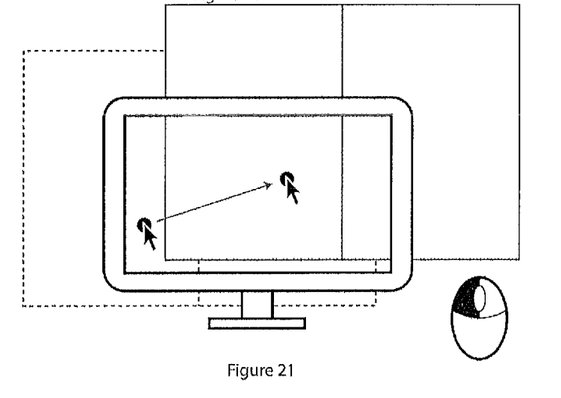
FIGS. 21 and 22 show a page displacement and sliding operation according to an embodiment.

The double page may be displaced in any direction whatsoever (within the limits of its dimensions) by holding the mouse button pressed down. This leads to an animation calculated in real time, the double page following the movements of the cursor (FIG. 21).

When the mouse button is released, the movement performed is analyzed to define the direction and speed. Below a minimum speed, the application considers that the page has been reset and stops any animation.

Figure 22:
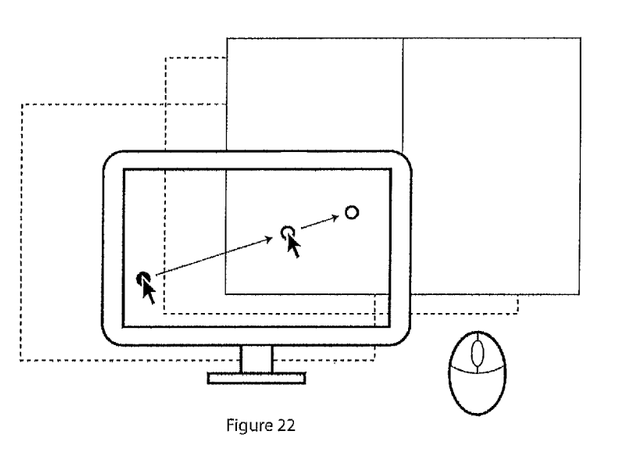

If the speed exceeds a certain threshold, the application considers that the page has been launched and continues in the direction of the analyzed movement with a linear translation animation simulating the sliding and deceleration of the double page (FIG. 22).

High-Definition Display and Animation Fluidity

To be able to zoom on pages by maintaining perfect legibility, two versions of each page should be used

- A low-definition version, made of a single bitmap image of the flattened page, that has the advantage of executing fluid animations since they are composed of a single object.
- A high-definition version, conserving the vector format of all the objects composing it, and enabling a sharp display regardless of the display resolution.

The high-definition version is constituted of a great deal of objects and does not enable fluid animation, while the low-definition version may not be enlarged without losing quality. Therefore, the zoom mode simultaneously uses the two page versions by stacking them and by alternating the display of one and the other depending on the browsing.

The low-definition version is visible at the start of the zoom mode at 100%, as well as during a zoom in or zoom out animation to conserve fluidity of movements. The high-definition version is recalculated every time a zoom animation ends, and is displayed over the low-definition version.

To be able to perform displacement animations without slowdowns, it is necessary to conserve bitmap flattening of the high-definition pages in the cache memory as long as the resolution is not modified again. This caching intervenes at the end of the zoom animation, and is released once a new zoom animation starts.

Breadcrumb Trail Mode

Figure 23:
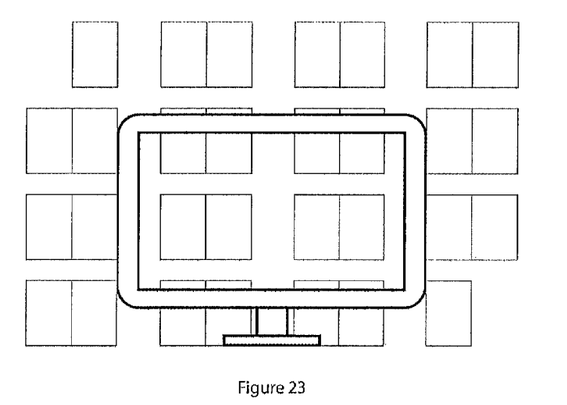
FIG. 23 shows a breadcrumb trail mode operation according to an embodiment.

The breadcrumb trail mode is constituted of all of the document pages, presented in double pages and disposed in grid form, enabling a complete vision of the entire document (FIG. 23). Each element of this grid will be called a "cell."

A cell comprises at the minimum a double page (except the first and last) and the necessary spacing around the double page for a display identical to the leafing mode, i.e., centered and only on the screen with a zoom of 100%.

The number of cells in this grid is determined from the number of pages in the document, by taking the first and last page to be presented independently into consideration.

The distribution of these cells between rows and columns is determined with relation to the height/width ratio of the application window.

Breadcrumb Trail Browsing and Manipulation

The breadcrumb trail applies the same principle of browsing as the zoom mode, enabling enlargement, contraction and translation movements of the grid to be carried out.

However, the desired objective is different, the zoom mode being used to read with precision and the breadcrumb trail mode to see the entire document.

Manipulation is done with any input peripheral, nevertheless, the use of a pointing peripheral such as a mouse or tactile surface enables all of the breadcrumb trail mode functions to be exploited.

We will take the mouse as an example for the following explanations.

At the start of the breadcrumb trail mode, the zoom level is 100% and cannot be greater than this value without leaving the breadcrumb trail mode. Browsing is done by using the mouse scroll wheel to modify the zoom level, by zooming in or zooming out depending on the direction of rotation given to the scroll wheel, the new zoom level being calculated proportionally to the force or the number of scroll wheel strokes.

Figure 24:
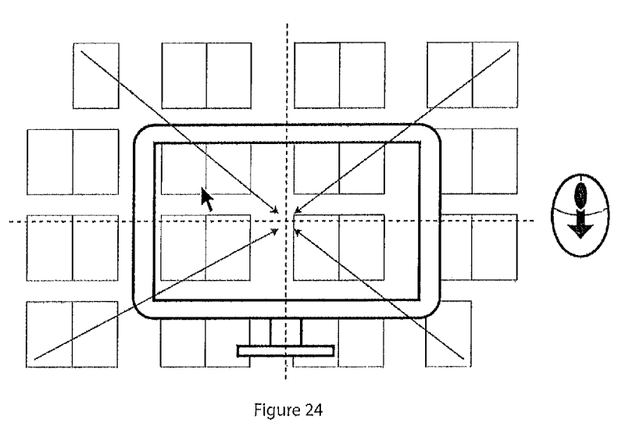
FIGS. 24-28 show a breadcrumb trail browsing and manipulation operation according to an embodiment.

As in zoom mode, zooming out leads to an animation contracting the grid, whose homothetic center is set to the center of the screen without taking the position of the cursor into consideration (FIG. 24).

Figure 25:
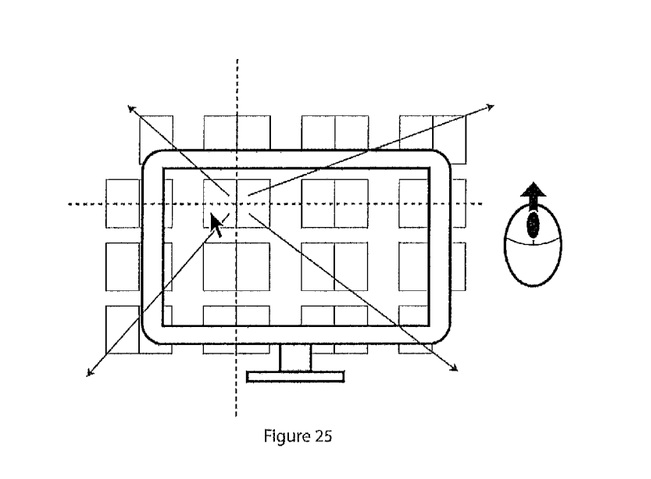

Zooming in in the breadcrumb trail mode is different from the zoom mode. It leads to an animation enlarging the grid, whose homothetic center is set to the center of the cell above which the mouse cursor is situated, or by default the center of the cell closest to the cursor (FIG. 25).

Figure 26:
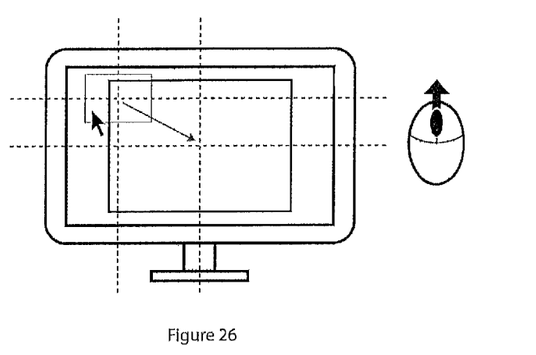

To this homothety is added a translation of the grid, defined by the straight line going from the center of the target cell to the center of the screen (FIG. 26).

Figure 27:
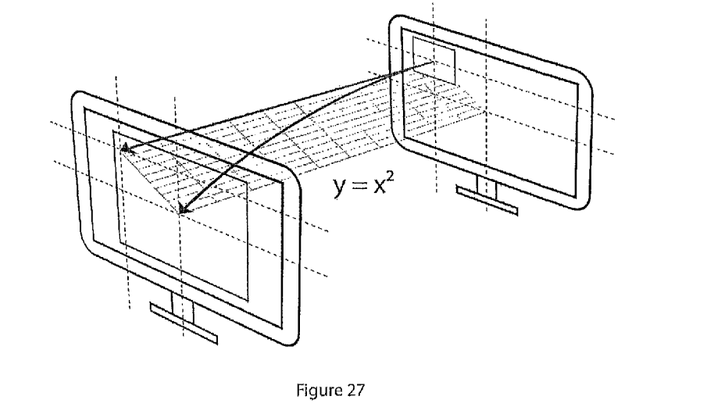

The zoom level at the square Serves as a multiplicative factor for this translation: The more it approaches the 100% value, the more pronounced the translation (FIG. 27).

The combination of these two animations dependent on the zoom level enables a curved trajectory to be given to the zoom in to optimize the display and ergonomics:

- At the low zoom level, the target double page remains close to the mouse cursor to prevent, by zooming on a page close to the edges of the screen, it from shifting too rapidly to the center and no longer being under the cursor.
- As the zoom level increases, the double page progressively moves away from the cursor to get closer to the center of the screen, which enables the double page to be refocused in a fluid movement if the 100% zoom level is reached.

Predefined 100% Zoom

Figure 28:
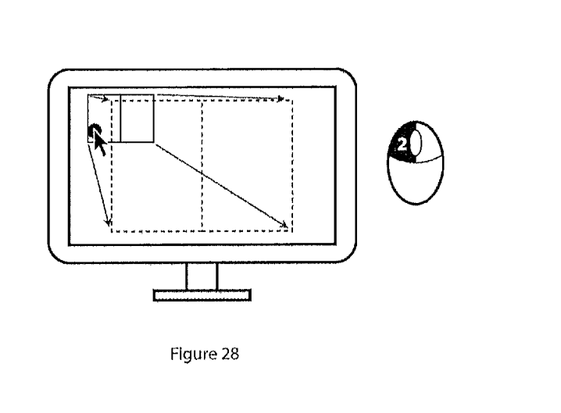

The application enables an automatic zoom to be performed on a cell, starting from any zoom level in progress whatsoever to the 100% zoom level. This automatic zoom is initiated by positioning the mouse cursor above the target cell and then by double-clicking on this cell (FIG. 28).

As with any zoom in, the progressive enlargement animation of the grid to the 100% zoom level is accompanied by a translation defined by the straight line going from the center of the target cell to the center of the screen (see FIG. 26).

However, this translation is performed linearly without using the zoom level at the square as a multiplicative factor, the state of arrival of the animation being known and unchanged until its end.

The double-click event may only lead to a single type of animation to a 100% zoom, unlike the cycle of progressive zoom values of zoom mode.

Breadcrumb Trail Displacement and Sliding

Breadcrumb trail mode manipulation (outside of zoom commands) applies the same principles and rules as the zoom mode: The grid may be displaced in any direction whatsoever (within the limits of its dimensions) by holding the mouse button pressed down, and may be reset or launched by releasing the mouse button.

The translations calculated are identical to the zoom mode, leading to the grid being anchored to the mouse cursor, and then sliding and deceleration of the grid terminating the movement.

Positioning Constraints

The zoom and breadcrumb trail modes that enable the graphic objects to be freely resized or displaced may lead to a positioning that is too far outside the screen.

Figure 29:
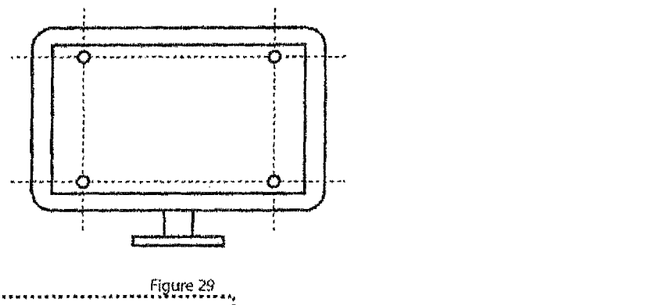
FIGS. 29 and 30 show the use of positioning constraints in the zoom and breadcrumb trail modes according to an embodiment.

To prevent this, the zoom and breadcrumb trail modes define the positioning constraints of the main graphic object, i.e., the maximum coordinates assigned to the top, bottom, left and right edges (FIG. 29) and applied in real time.

Figure 30:
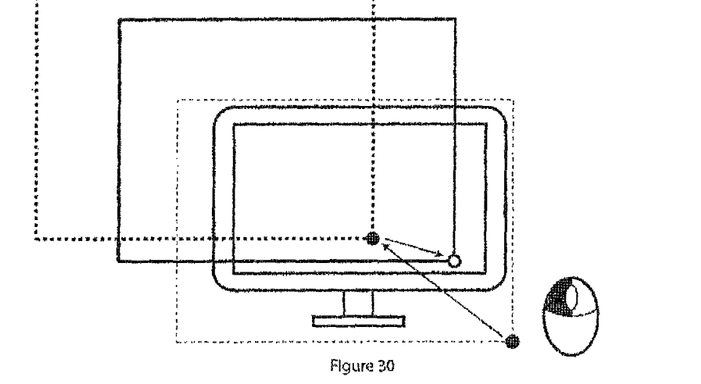

Exceeding the limits is allowed as long as the mouse button remains pressed, the translation of the graphic object following the cursor being divided in half. When the mouse button is released, the positioning constraints are applied by a sliding animation (translation+deceleration) bringing the graphic object to its limits (FIG. 30).

Leafing mode does not enable the graphic object of the double page to be resized or displaced on the screen, and therefore does not comprise positioning constraints.

Transition Between Two Modes

All of the interest in our invention is based on the complementarity of three modes of presentation. The ergonomic principle is to be able to literally move very close together or move back with a simple and intuitive manipulation, by alternating the modes depending on the zoom level. Consequently, the mode changes must be designed to be completely transparent to the user.

Principle of Stacking

The visual layout of the leafing mode forms the basis of the input and output points of the zoom and breadcrumb trail modes, the double page must be centered on the screen with a zoom level of 100%. This layout constant is ensured by the zoom animation calculations explained previously, applying the necessary rules to move towards a refocusing of the graphic object as the zoom level approaches 100%.

Figure 31:
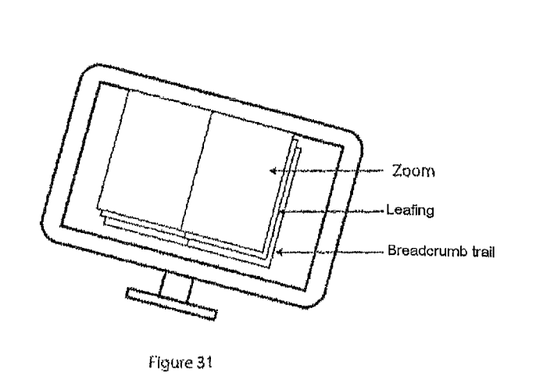
FIG. 31 shows the stacking of three different display modes according to an embodiment.

As the input/output points of the zoom/breadcrumb trail modes are visually identical to the leafing mode, the three modes are perfectly stacked to ensure an invisible transition (FIG. 31).

As the leafing mode (zoom level of 100%) constitutes an essential passage, it is not possible to pass directly from zoom mode to breadcrumb trail mode, and conversely. This down time has a double interest:

Enables the user to quickly return to the leafing mode via a pronounced scroll wheel stroke without concerning himself with its precision.

Giving the application the period of time necessary to proceed with the mode change.

Leafing Mode and Zoom Mode

When a zoom level greater than 100% is requested from the leafing mode, the application initializes the zoom mode view by duplicating the low-definition versions of the double page in progress, and by launching the loading of high-definition versions of these two pages. Without waiting for the end of the loading, the zoom mode view is displayed and the leafing mode view is masked.

The zoom mode is then fully active and the enlargement animation responding to the initial zoom in command is executed. Once the high-definition versions have loaded, the process of alternation explained previously between these two versions is put in place.

The act of bringing the zoom level to 100% is equivalent to an exit from the zoom mode, which is executed by displaying the leafing mode view and then by masking the zoom mode view. The leafing mode is then fully active, not having undergone a modification in the meantime.

The act of not releasing the zoom mode enables the invention to return there consecutively without going through the initialization phase again, the high and low definition versions of the pages still being present in memory.

Leafing Mode and Breadcrumb Trail Mode

When a zoom level of less than 100% is requested from the leafing mode, the application initializes the breadcrumb trail view by modifying its position, stacking the double page in progress of the leafing mode with the corresponding double page on the grid. This position modification is done without immediate animation.

The breadcrumb trail mode view is displayed and the leafing mode view is masked. The breadcrumb trail mode is then fully active and the contraction animation responding to the initial zoom out command is executed.

The act of bringing the zoom level to 100% is equivalent to an exit from the breadcrumb trail mode.

The application then initializes the leafing mode view with the double page previously targeted in the breadcrumb trail view. This modification of page stacks in leafing mode is done without immediate animation. The leafing mode view is then displayed and the breadcrumb trail view is masked, terminating the transition between the two modes. The leafing mode is then fully active and the user may again turn the pages.

The invention claimed is:

1. A stationary or mobile terminal capable of being controlled by a pointing or input peripheral, the terminal comprising:

storage means on which a plurality of pages are stored;

means for displaying the plurality of stored pages in a form of a grid defining a breadcrumb trail, each element of said breadcrumb trail being composed of a front or back of a single page, or a front of one page and a back of another conjoined page that form a double page, an assembly of said elements being ordered by default in an ascending direction of the pages;

means for displaying a leafing view composed of two stacks of recto verso pages respectively forming a left stack and a right stack and respectively ordered in the ascending direction and a descending direction, or a single stack containing all of the recto verso pages, ordered in the ascending or descending direction, all belonging to the plurality of stored pages;

means for controlling said means for displaying comprising:

means for detecting user interaction by means of a mouse and/or a keyboard, comprising a detection of the position and movements of a cursor, a pressure and release of a button, a direction and amplitude of a scroll wheel movement, and a single, maintained or repeated pressing of one or more keys of a keyboard simultaneously;

means for detecting a single or double target page of said breadcrumb trail that is defined as being one of said single or double pages depending on the detection of the position of the cursor or the position of said breadcrumb trail on a screen of the stationary or mobile terminal;

means for executing an animation simulating a zoom-in or zoom-out composed of a homothety and/or a translation of said breadcrumb trail;

means for modifying the animation simulating a zoom-in or zoom-out composed of a homothety and/or a translation of said breadcrumb trail, enabling a progressive refocusing of said single or double target page of the breadcrumb trail as their respective dimensions move towards fixed dimensions of left and right current pages of the leafing view;

means for displaying and masking said breadcrumb trail and leafing view, ensuring an invisible transition for the user by stacking said single or double target page and said left and right current pages when their respective dimensions and positions are identical.

2. The stationary or mobile terminal according to claim 1, wherein said means for controlling comprise means for detecting a change of current pages by the user in said leafing view, and for modifying the position of said breadcrumb trail when said breadcrumb trail is masked, enabling a continuity of invisible transitions for the user by stacking the new current pages of said leafing view with a corresponding double page of said breadcrumb trail.

3. A method for controlling a stationary or mobile terminal, the method comprising:

storing a plurality of pages in a storage device of the stationary or mobile terminal;

displaying, on a screen of the stationary or mobile terminal, the plurality of stored pages in a form of a grid defining a breadcrumb trail, each element of said breadcrumb trail being composed of a front or back of a single page, or a front of one page and a back of another conjoined page that form a double page, an assembly of said elements being ordered by default in an ascending direction of the pages;

displaying, on the screen of the stationary or mobile terminal, a leafing view composed of two stacks of recto verso pages respectively forming a left stack and a right stack and respectively ordered in the ascending direction and a descending direction, or a single stack containing all of the recto verso pages, ordered in the ascending or descending direction, all belonging to the plurality of stored pages;

controlling said displaying by detecting user interaction with a mouse and/or a keyboard, the detecting comprising a detection of the position and movements of a cursor, a pressure and release of a button, a direction and amplitude of a scroll wheel movement, and a single, maintained or repeated pressing of one or more keys of a keyboard simultaneously;

detecting a single or double target page of said breadcrumb trail that is defined as being one of said single or double pages depending on the detection of the position of the cursor or the position of said breadcrumb trail on the screen of the stationary or mobile terminal;

executing an animation simulating a zoom-in or zoom-out composed of a homothety and/or a translation of said breadcrumb trail;

modifying the animation simulating a zoom-in or zoom-out composed of a homothety and/or a translation of said breadcrumb trail, enabling a progressive refocusing of said single or double target page of the breadcrumb trail as their respective dimensions move towards fixed dimensions of left and right current pages of the leafing view;

displaying and masking said breadcrumb trail and leafing view, ensuring an invisible transition for the user by stacking said single or double target page and said left and right current pages when their respective dimensions and positions are identical.

4. The method for controlling a stationary or mobile terminal according to claim 3, wherein said controlling comprise detecting a change of current pages by the user in said leafing view, and modifying the position of said breadcrumb trail when said breadcrumb trail is masked, enabling a continuity of invisible transitions for the user by stacking new current pages of said leafing view with a corresponding double page of said breadcrumb trail.

* * * * *